(12) United States Patent
Fourrey et al.

(10) Patent No.: US 6,595,591 B2
(45) Date of Patent: Jul. 22, 2003

(54) MOTOR VEHICLE SEAT BACK

(75) Inventors: François Fourrey, Corquilleroy (FR); Frédéric Baret, Dourdan (FR)

(73) Assignee: Faurecia Sieges d'Automobile SA, Nanterrre (FR)

( * ) Notice: Subject to any disclaimer, the term of this patent is extended or adjusted under 35 U.S.C. 154(b) by 0 days.

(21) Appl. No.: 10/089,249

(22) PCT Filed: Aug. 3, 2001

(86) PCT No.: PCT/FR01/02545

§ 371 (c)(1),
(2), (4) Date: Mar. 28, 2002

(87) PCT Pub. No.: WO02/12018

PCT Pub. Date: Feb. 14, 2002

(65) Prior Publication Data

US 2002/0149252 A1 Oct. 17, 2002

(30) Foreign Application Priority Data

Aug. 4, 2000 (FR) .............................................. 00 10337

(51) Int. Cl.[7] .................................................. A47C 7/00
(52) U.S. Cl. ............................... 297/440.11; 297/218.2; 297/452.2; 297/218.5; 297/452.56; 297/218.4; 297/226
(58) Field of Search ...................... 297/452.18, 440.11, 297/452.38, 452.56, 216.13, 452.2, 218.3, 218.4, 432.1, 188.07, 452.14, 225, 226, 228.1, 228.12, 229, 452.58, 452.59, 218.5

(56) References Cited

U.S. PATENT DOCUMENTS

| | | | | |
|---|---|---|---|---|
| 4,192,548 A | * | 3/1980 | Williams ................ | 297/452.48 |
| 4,208,070 A | * | 6/1980 | Geschwender ............. | 297/118 |
| 4,740,260 A | | 4/1988 | Selbert et al. .............. | 156/213 |
| 5,015,034 A | * | 5/1991 | Kindig et al. ................ | 297/227 |
| 5,023,125 A | * | 6/1991 | Gray ........................... | 428/100 |
| 5,121,938 A | * | 6/1992 | Gross et al. .............. | 280/304.1 |
| 5,131,721 A | * | 7/1992 | Okamoto ................ | 297/452.18 |
| 5,289,958 A | * | 3/1994 | Jay ............................. | 224/155 |
| 5,295,732 A | | 3/1994 | Boisset ..................... | 297/452.1 |
| 5,360,258 A | * | 11/1994 | Alivizatos .............. | 297/440.11 |
| 5,496,094 A | * | 3/1996 | Schwartzkopf et al. ........ | 297/45 |
| 5,564,785 A | * | 10/1996 | Schultz et al. ........... | 297/452.2 |
| 5,582,463 A | * | 12/1996 | Linder et al. ............. | 297/452.2 |
| 5,803,539 A | * | 9/1998 | Dewar et al. .......... | 297/228.12 |
| 5,810,446 A | * | 9/1998 | Tadokoro ................ | 297/452.18 |
| 5,845,966 A | * | 12/1998 | Severinski et al. .... | 297/216.13 |
| 5,851,055 A | * | 12/1998 | Lewis ........................ | 297/483 |
| 5,954,395 A | * | 9/1999 | Moulins et al. ........... | 297/218.4 |
| 6,027,171 A | * | 2/2000 | Partington et al. ..... | 297/452.18 |
| 6,050,646 A | * | 4/2000 | Stenzel et al. ......... | 297/452.59 |
| 6,082,823 A | * | 7/2000 | Aumont et al. .......... | 297/452.2 |
| 6,345,428 B2 | * | 2/2002 | Apissomian ................ | 29/428 |
| 6,357,789 B1 | * | 3/2002 | Harada et al. ........... | 280/730.2 |
| 6,361,115 B1 | * | 3/2002 | Aufrere et al. ........ | 297/452.18 |
| 6,425,637 B1 | * | 7/2002 | Peterson ................... | 297/452.3 |

FOREIGN PATENT DOCUMENTS

FR   2 779 393   6/1998

OTHER PUBLICATIONS

International Search Report dated Nov. 27, 20012, Appl. No. PCT/FR01/02545.

* cited by examiner

Primary Examiner—Peter M. Cuomo
Assistant Examiner—Stephanie Harris
(74) Attorney, Agent, or Firm—McCracken & Frank

(57) ABSTRACT

A vehicle seat back comprises firstly a rigid frame having first and second side uprights and top and bottom crossmembers interconnecting the first and second side uprights, and secondly a resilient supporting sheet fixed to the rigid frame and placed so as to come directly into contact with the back of a user. The supporting sheet forms a bag that is fitted onto the rigid frame over its first side upright so as to cover the top and bottom cross-members and the first side upright, the resilient supporting sheet being fixed to the second side upright.

10 Claims, 2 Drawing Sheets

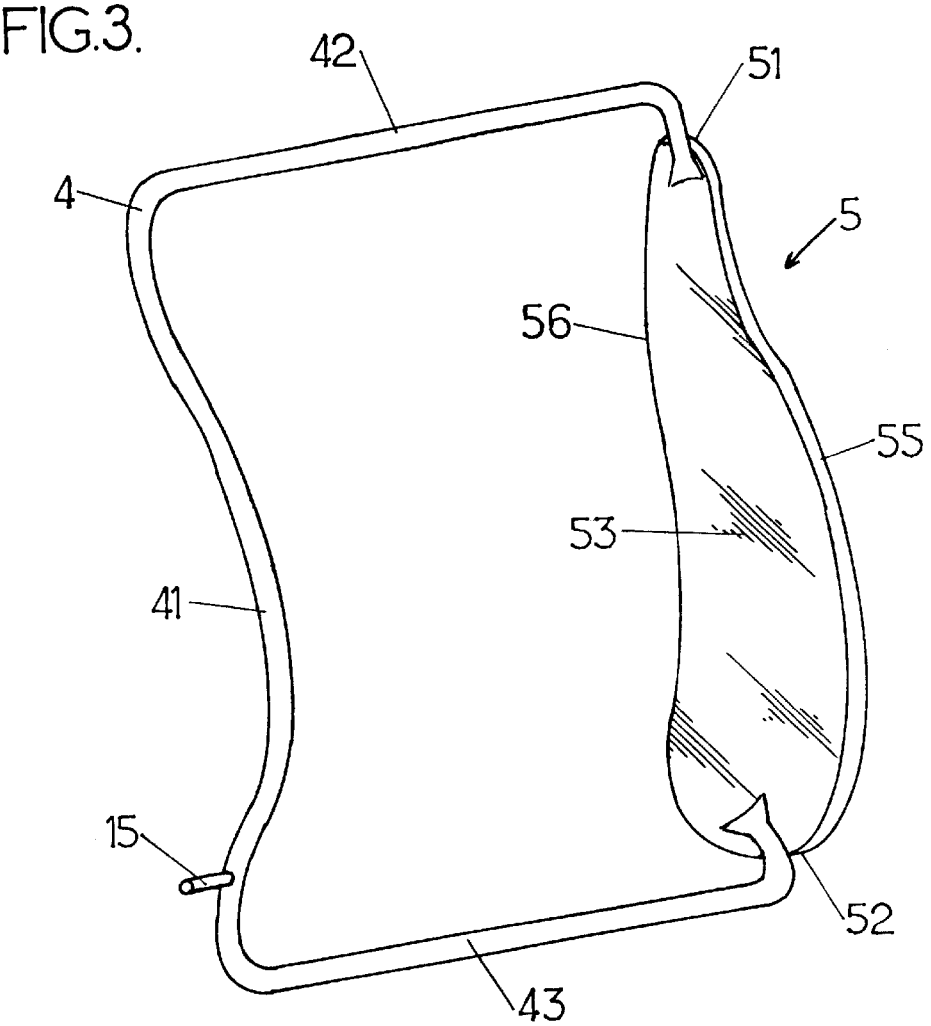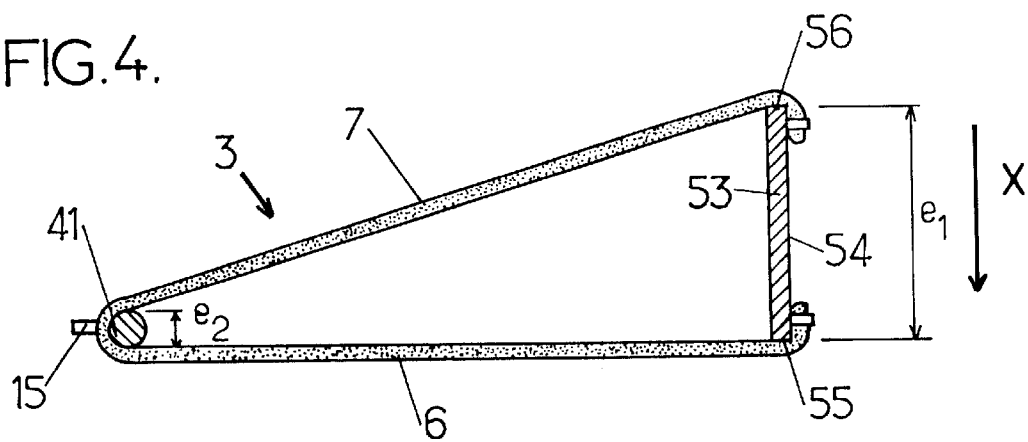

MOTOR VEHICLE SEAT BACK

FIELD OF THE INVENTION

The present invention relates to motor vehicle seat backs.

More particularly, the invention relates to a motor vehicle seat back which comprises firstly a rigid frame having first and second side uprights and top and bottom cross-members interconnecting the first and second side uprights, and secondly a resilient supporting sheet fixed to the rigid frame and placed so as to come directly into contact with the back of a user.

BACKGROUND OF THE INVENTION

In this type of back, the side uprights and the top and bottom cross-members forming the rigid frame are constituted by tubes, and the resilient supporting sheet is fixed directly to the inner periphery of the frame. The supporting sheet is therefore substantially in the form of a rectangle and all around its outer periphery it has fasteners for cooperating with complementary members, correspondingly disposed all around the inner periphery of the rigid frame. It will therefore be understood that fitting the supporting sheet to the frame requires the fasteners of said sheet to be fastened one after another to the complementary members of the rigid frame, thereby complicating assembly of the back and considerably increasing the time and cost of assembly.

SUMMARY OF THE INVENTION

An object of the present invention is to mitigate the above-mentioned drawbacks.

The invention achieves its object by the fact that the supporting sheet has a front face and a rear face, each having respective top and bottom edges and respective first and second side edges, said front and rear faces being secured to each other firstly via their top and bottom edges, and secondly via the first side edges so that the supporting sheet forms a bag for fitting onto the rigid frame by passing over the first side upright and covering the top and bottom cross-members and the first side upright, and by the fact that the second side edges of the front and rear faces of the resilient supporting sheet are fixed to the second side upright.

By means of these dispositions, the resilient supporting sheet which forms a bag can be fitted directly onto the rigid frame via one of its side uprights, and then needs to be fixed only to the other side upright, thereby making it possible to simplify assembly of the seat back for fitting to a seat proper of a vehicle seat, and considerably reducing the time required for said assembly.

In preferred embodiments of the invention, use may optionally be made of one or more of the following dispositions:

- the second side upright is constituted by a side plate of depth, as measured perpendicularly to the front face of the resilient supporting sheet, greater than the depth of the first side upright and of the top and bottom cross-members;
- the first side upright and the top and bottom cross-members are made from a single piece of tube that is substantially U-shaped;
- the side plate has a rear edge and a front edge for facing the back of the user, said front edge being substantially identical in shape to the first side upright;
- the side plate has an outside face facing away from the first side upright, the outside face having first and second series of hooks, and the second side edges of the front and rear faces of the resilient supporting sheet having respective first and second series of hems receiving respective first and second rigid rods which are fixed to the first and second series of hooks by the resilient return force exerted by the front and rear faces of the resilient supporting sheet;
- the side plate has a top end and a bottom end relatively welded to the top cross-members and to the bottom cross-members; and
- the side plate is covered by a protective cover-plate.

BRIEF DESCRIPTION OF THE DRAWINGS

Other characteristics and advantages of the invention appear from the following description of an embodiment thereof, given by way of non-limitative example and with reference to the accompanying drawings, in which:

FIG. 3 is a perspective view of the rigid frame of the back; and

FIG. 4 is a plan view in section of the back.

DESCRIPTION OF THE PREFERRED EMBODIMENT

In the various figures, the same references are used to designate elements that are identical or similar.

Figure 1:
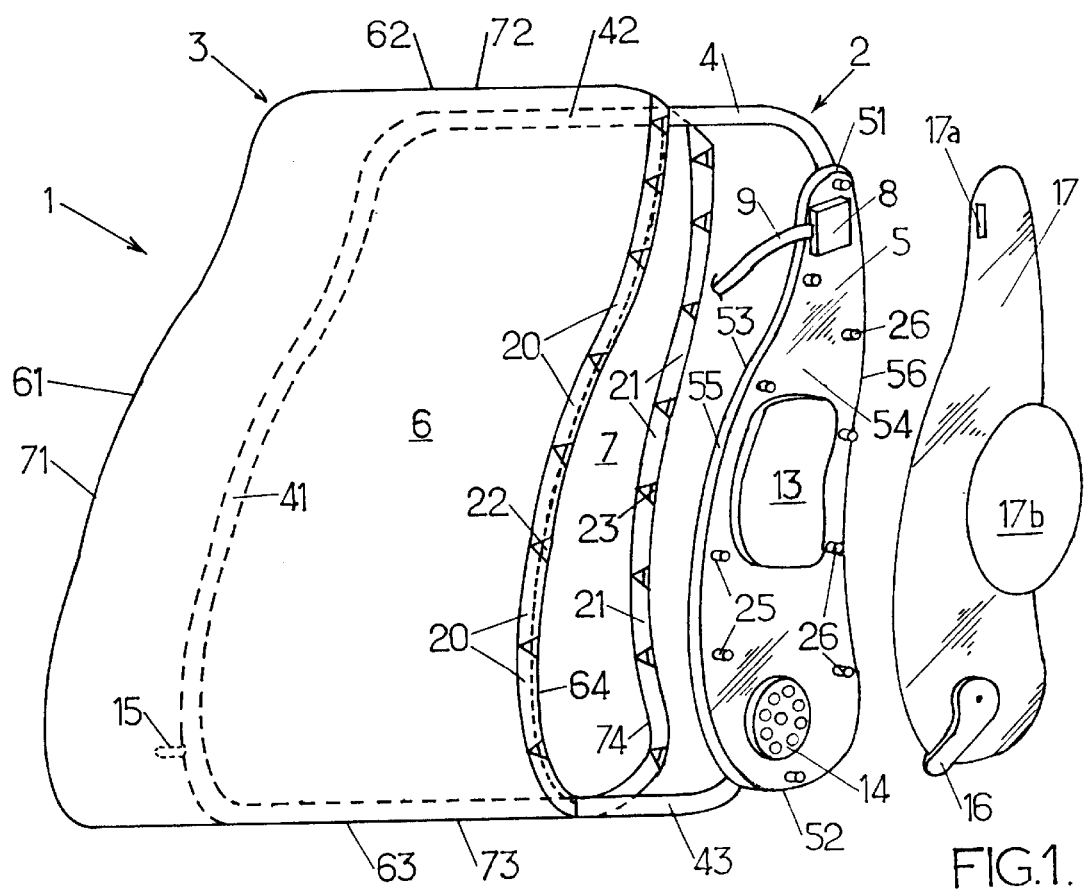
FIG. 1 is a perspective view of the vehicle seat back of the invention.

FIG. 1 shows a back 1 for a front seat of a motor vehicle, which back comprises a rigid frame 2 and a resilient supporting sheet 3 fixed directly onto the rigid frame 2 of the back.

The frame 2 comprises a first side upright 41, a second side upright 5, and top and bottom cross-members 42 and 43. The first side upright 41 and the top and bottom cross-members 42 and 43 are constituted by tubes that can be welded together or they can be made by bending a single piece 4 of tube.

The side tube 41 and the top and bottom tubes 42 and 43 are circular in section and of small diameter, e.g. about 3 centimeters (cm).

The ends of the top and bottom tubes 42 and 43, remote from the side tube 41, are fixed to the side plate 5 which extends substantially vertically between a top end 51 and a bottom end 52.

The side plate 5 also comprises an inside face 53 placed facing the side tube 41 and an outside face 54 facing away from said side tube 41. These inside and outside faces 53 and 54 of the side plate 5 are defined by a rear edge 56 and a front edge 55 that is intended to face the back of a user occupying the seat.

As can be seen in FIG. 3, the ends of the top and bottom tubes 42 and 43 of the frame 4 which are connected to the side plate 5 can be flattened by stamping prior to being fixed to the top and bottom ends 51 and 52 of said side plate 5 by welding.

The resilient supporting sheet 3 of the back is substantially in the form of a bag comprising a rear face 7 and a front face 6 that is designed to come directly into contact with the back of a user sitting on the seat. In order to provide the seat user with sufficient comfort, the supporting sheet is constituted by a resilient net of relatively narrow mesh, or by a resilient fabric.

The front and rear faces 6 and 7 of the resilient sheet have respective top edges 62, 72 and bottom edges 63, 73, and also respective first side edges 61, 71 and second side edges 64, 74.

In order to enable the resilient supporting sheet to form a bag which can be fitted directly onto the rigid frame 2 of the back, the front and rear faces 6 and 7 are connected together, firstly along their top and bottom edges 62, 72 and 63, 73, and secondly along their first side edges 61, 71. The front and rear faces 6 and 7 can be interconnected by stitching, or they can be made as a single piece.

Thus, once the resilient supporting sheet 3 is fitted onto the frame 2 by surrounding the top and bottom tubes 42 and 43 and the side tube 41, all that remains to be done is to fix the second side edges 64 and 74 of the front and rear faces of the sheet to the side plate 5.

For this purpose, the second side edges 64 and 74 of the front and rear faces 6 and 7 of the sheet comprise relatively a first series of hems 20 and a second series of hems 21 with first and second rigid rods 22 and 23 engaged respectively therein.

The various hems 20 and 21 of the first and second series need to be spaced apart from one another sufficiently to enable the rigid rods 22 and 23 to present portions that are uncovered.

The side plate 5 has a first series of hooks 25 and a second series of hooks 26 on its outside face 54, which hooks are situated respectively in the vicinity of the front edge 55 and of the rear edge 56 of said side plate.

Thus, in order to fix the resilient supporting sheet to the side plate 5, it suffices to stretch the front and rear faces 6 and 7 of said sheet so as to bring the hems 20 and 21 over the outside face of the side plate, and then to place the uncovered portions of the rigid rods 22 and 23 so as to bear respectively against the first and second series of hooks 25 and 26. The supporting sheet is then held in place on the rigid frame 2 by the resilient return force exerted by the front and rear faces 6 and 7 of said sheet on the hooks of the side plate 5.

The outside face 54 of the side plate 5 is then covered by a removable cover-plate 17 which is fixed directly to said side plate, e.g. by snap-fastening or by screw fasteners.

As can be seen in FIG. 4, according to an advantageous characteristic of the invention, the side plate is of depth $e_1$ considerably greater than the depth $e_2$ of the side tube 41 measured in a direction perpendicular to the front face 6 of the supporting sheet 3, i.e. in a direction X which extends between the front and rear edges 55 and 56 of the side plate 5.

The depth $e_1$ of the side plate 5 can vary between its top and bottom ends 51 and 52 while nevertheless remaining considerably greater than the depth of the tubes forming the frame 4. By way of example, the side plate 5 can be substantially triangular in shape with a bottom end 52 of depth greater than the depth of its top end 51, the front and rear edges 55 and 56 then converging toward end 51.

Thus, as can be seen in FIG. 1, the depth of the side plates in the direction X perpendicular to the supporting sheet 3 is sufficient to enable devices involved in user safety or comfort to be fitted directly to the outside face 54 of said side plate.

Figure 2:
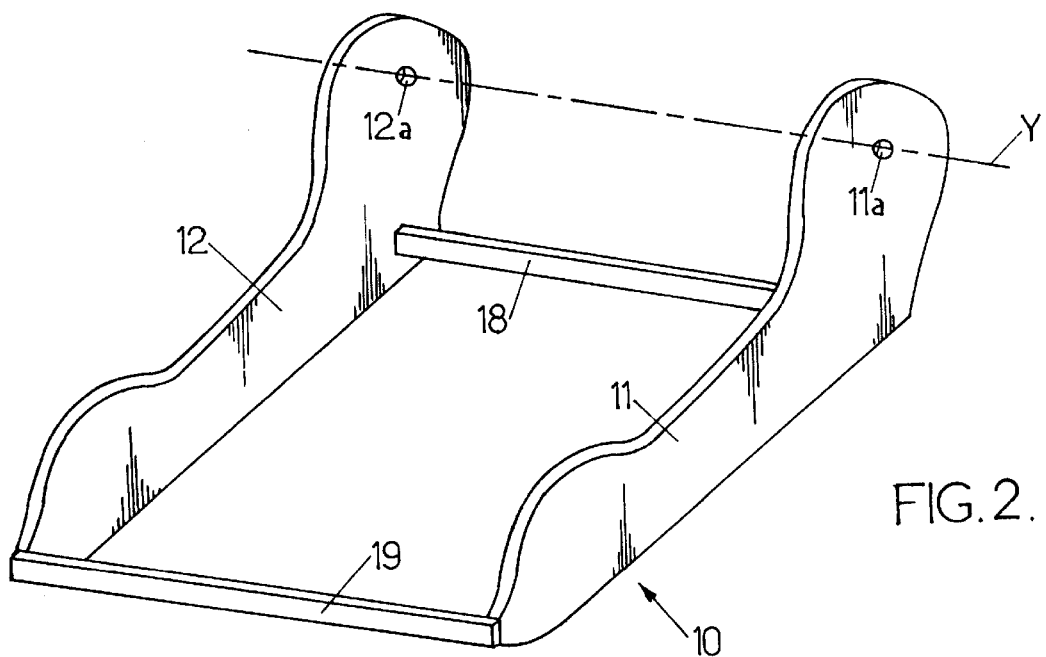
FIG. 2 is a perspective view of a rigid strength member for a seat proper to which the back of the invention is to be connected.

In particular, the outside face 54 of the side plate can be provided at its top end 51 with a winder 8 for a seatbelt 9, or more generally with a top anchor point for said seatbelt 9. Two bottom anchor points (not shown) for the seatbelt can be fixed, for example to the seat proper 10 of the vehicle seat (FIG. 2), or more precisely to the two side plates 11 and 12 of the seat proper 10 of the seat.

Thus, in the event of the vehicle being subjected to a longitudinal impact tending to throw the user of the seat forwards, the top portion of the seatbelt 9 pulls essentially on the side plate 5 of the back, which is strong enough to withstand this pull because of its relatively large depth in the X axis direction, i.e. in the direction of the longitudinal axis of the vehicle.

The outside face 54 of the side plate 5 can also be provided with an airbag device 13 in its middle portion, halfway between its top and bottom ends 51 and 52, the airbag serving to provide additional lateral safety for the seat user.

Similarly, the outside face 54 of the side plate can also be provided with a hinge mechanism 14 at its bottom end 52, the hinge mechanism being for connection to the seat proper 10 of the seat to enable the back 1 to pivot about a horizontal axis Y extending substantially parallel to the front face 6 of the resilient supporting sheet 3.

In one possible embodiment of the connection between the back 1 and the seat proper 10, the rigid frame 2 of the back is placed between the side plates 11 and 12 of the seat proper 10 so that a pivot 15 situated at the bottom end of the side tube 41 is received in a hole 12a of the side plate 12 of the seat proper, while the hinge mechanism 14 is situated directly in a suitable housing formed on the inside face of the side plate 11 of the seat proper. The two side plates 11 and 12 of the seat proper are connected to each other by means of two spacers 18 and 19.

The hinge mechanism 14 is controlled by a handle 16 fitted to the cover-plate 17 covering the outside face 54 of the side plate 5, said handle 16 being connected to the hinge mechanism 14 by means of a rigid connecting bar (not shown) passing through a hole 11a formed in the side plate 11 of the seat proper 10.

The cover-plate 17 also has an orifice 17a through which the seatbelt 9 passes, and an additional cover-plate 17b for separating from the main cover-plate when the airbag is deployed.

As can be seen in FIGS. 1 and 3, the front edge 55 of the side plate 5 and the side tube 41 of the frame 4 are substantially identical in shape so as to provide symmetrical side supports for a user of the vehicle seat.

Advantageously, the front edge 55 of the side plate 5, the cover-plate 17, and the side tube 41 all present respective substantially convex portions facing forwards so as to provide lumbar support for the user of the seat.

What is claimed is:

1. A motor vehicle seat back comprising firstly a rigid frame having first and second side uprights and top and bottom cross-members interconnecting the first and second side uprights, and secondly a resilient supporting sheet fixed to the rigid frame and placed so as to come directly into contact with the back of a user, wherein the supporting sheet has a front face and a rear face, each having respective top and bottom edges and respective first and second side edges, said front and rear faces being secured to each other firstly via their top and bottom edges, and secondly via the first side edges so that the supporting sheet forms a bag for fitting onto the rigid frame by passing over the first side upright and covering the top and bottom cross-members and the first side upright, and wherein the second side edges of the front and rear faces of the resilient supporting sheet are fixed to the second side upright.

2. A back according to claim 1, wherein the second side upright is constituted by a side plate of depth, as measured perpendicularly to the front face of the resilient supporting sheet, greater than the depth of the first side upright and of the top and bottom cross-members.

3. A back according to claim 2, wherein an inflatable airbag device is fitted to the side plate.

4. A back according to claim 2, wherein a winder device for a seatbelt is fitted to the side plate.

5. A back according to claim 2, wherein the side plate includes a hinge device for connection to a seat proper of a vehicle seat to enable the back to pivot about a horizontal axis.

6. A back according to claim 1, wherein the first side upright and the top and bottom cross-members are made from a single piece of tube that is substantially U-shaped.

7. A back according to claim 2, wherein the side plate has a rear edge and a front edge for facing the back of the user, said front edge being substantially identical in shape to the first side upright.

8. A back according to claim 2, wherein the side plate has an outside face facing away from the first side upright, the outside face having first and second series of hooks, and the second side edges of the front and rear faces of the resilient supporting sheet having respective first and second series of hems receiving respective first and second rigid rods which are fixed to the first and second series of hooks by the resilient return force exerted by the front and rear faces of the resilient supporting sheet.

9. A back according to claim 2, wherein the side plate has a top end and a bottom end respectively welded to the top cross-member and to the bottom cross-member.

10. A back according to claim 2, wherein the side plate is covered by a protective cover-plate.

* * * * *